UNITED STATES PATENT OFFICE.

JOHN I. FULTON, OF MONONGAHELA CITY, PENNSYLVANIA.

IMPROVEMENT IN TANNING.

Specification forming part of Letters Patent No. 9,840, dated July 12, 1853.

*To all whom it may concern:*

Be it known that I, JOHN I. FULTON, of Monongahela City, in the county of Washington and State of Pennsylvania, have invented a new and Improved Composition for Preparing Hides for Tanning; and I do hereby declare that the following is a full and exact description thereof.

The nature of my invention consists in the use of the muriate of ammonia, in combination with niter in solution, for the purpose of preparing hides to accelerate the tanning process.

To enable others skilled in the art to use my invention, I will proceed to describe the manner in which I apply my composition.

After having bated and cleansed the hides of their impurities I employ muriate of ammonia in combination with niter. After dissolving the ingredients I put the same into water sufficient to cover the hides in the proportion of two to three pounds of the former to seven to ten pounds of the latter for a pack of twenty slaughter-hides averaging seventy-five pounds green weights, or for one hundred calfskins averaging ten pounds green weights. I put my hides into this preparation and stir or handle them as occasion may require, letting them remain in it until they have absorbed a sufficiency of the composition, the length of time depending on the temperature of the weather. After taking my hides out of this composition I put them into a weak bark-liquor, and let them remain in this one day, or until a fine grain is formed on the leather. I then put them into a strong bark-liquor, letting them remain in this from three to five days, when they will be sufficiently plumped and in good condition for laying away in strong leached liquor and bark.

The advantages to be derived in the employment of the above composition are the producing a superior article of leather in a much shorter time than can be done by the usual methods. Hides prepared by this composition are capable of absorbing the tannin from strong decoctions of leeched bark without a contraction of the fibers or a hardening of the surface, thus obviating the difficulties heretofore encountered in the employment of strong ooze in the first stages of tanning. I save nearly one-third the bark usually required from the fact that hides thus prepared are capable of absorbing the tannin before the tannic acid is converted into gallic acid to such an extent that tanners by the usual slow methods sustain a loss. The chemical effect in the use of my composition in the suspension of putrefaction, opening the pores, plumping the hides, and adding strength to the animal tissues, &c., it may not be necessary for me to dwell upon.

Having thus set forth the nature or principle of my invention and the advantages thereof, what I claim as my invention, and desire to secure by Letters Patent, is—

The use of muriate of ammonia, in combination with niter, for the purpose of suspending putrefaction, adding strength to the animal tissues, and for useful purposes in the manufacture of leather, as set forth.

JOHN I. FULTON.

Witnesses:
  I. GORDON,
  ABRAM FULTON.